May 22, 1934. C. H. SMITH 1,960,127
WELDED VALVE BODY
Filed July 8, 1932
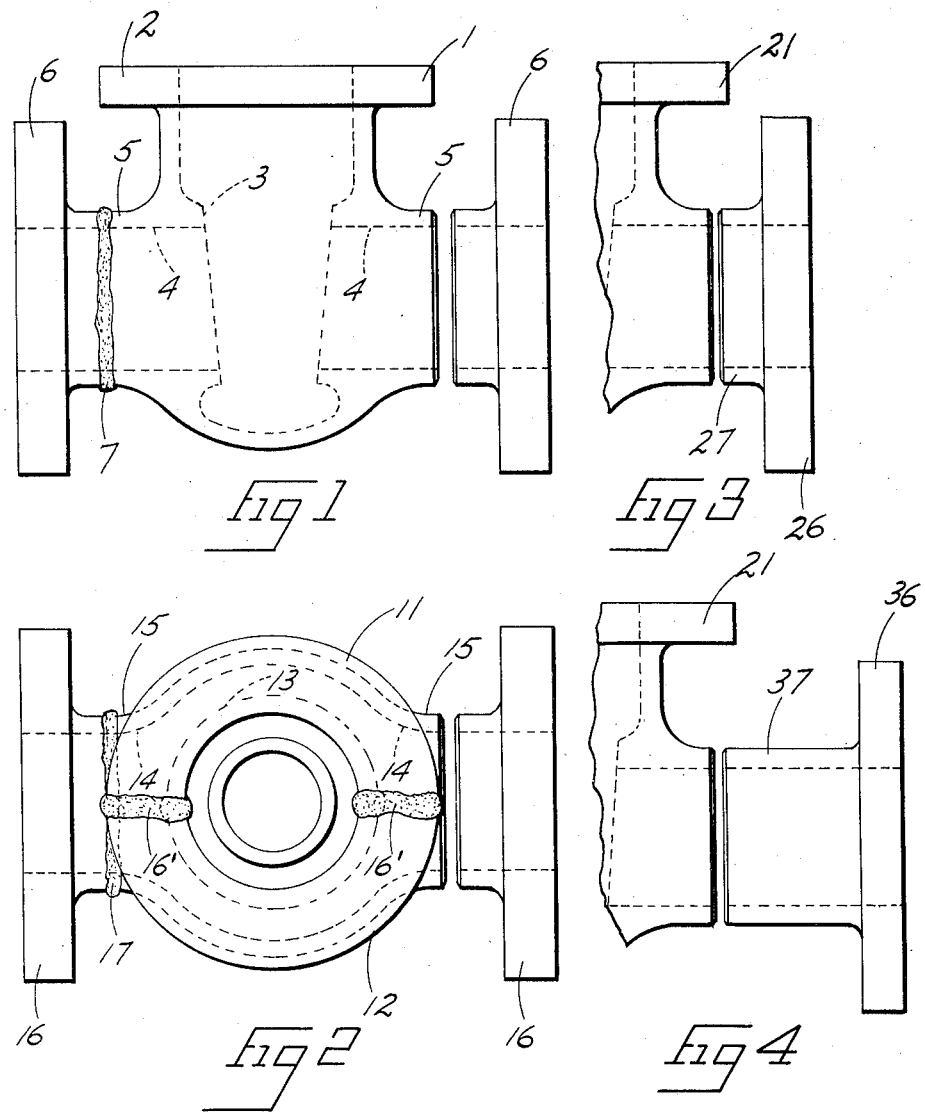
Inventor
CHARLES H. SMITH.
By Richey F. Hatt
Attorney Patented May 22, 1934

1,960,127

UNITED STATES PATENT OFFICE 1,960,127

WELDED VALVE BODY

Charles H. Smith, Cleveland, Ohio

Application July 8, 1932, Serial No. 621,377

2 Claims. (Cl. 251—156)

This invention relates to a valve body construction.

Where it is necessary to provide considerable strength in the body of a valve in order to meet the temperatures and pressures to which the valve may be subjected in use, as for instance in connection with oil cracking equipment, the manufacturing operations which are necessary in order to provide such strength become unduly expensive. It is the object of this invention to provide a novel type of valve construction which, by reason of the nature of its design, permits a greater facility in its manufacture with a reduction in the cost of manufacture.

While cast steel valves may be used in some instances, it is common, in order to afford a maximum of strength in the valve body to make the valve body by forging it. The construction and arrangement of a valve body is such that it does not lend itself readily to forging operations and therefore forged valve bodies have heretofore been costly. It is another object of this invention to provide a novel construction of valve body which is readily amenable to forging operations and therefore less expensive to make.

In the past it has been common in the manufacture of forged valve bodies to make it up in one unit which is a difficult and expensive forging operation. It is an object of the present invention to provide a novel type of valve construction in the form of a plurality of separate parts, each of which may be more readily formed either by casting or forging or in any other suitable way than to form the valve body as a whole by the corresponding method. It is another object of the invention to provide a valve body construction in which a plurality of complemental parts are united to form the valve body by welding.

According to the standard specifications provided for valve bodies it happens that certain valve series, according to the pressure, differ, one from the other, in corresponding sizes, chiefly in the length of the valve body while certain other characteristics, such as the minimum thickness of metal, may be substantially the same in both instances. It is another object of the present invention to provide a novel valve body construction made up of a plurality of separate parts such that certain of the parts may be used universally for a plurality of differently sized valve bodies of different series, the universal part being adapted to the different sizes and series by variations in size or dimensions of the parts to be combined therewith in building up the completed valve body. Such a valve body construction permits of greater standardization in the manufacture of certain parts of a line of valve bodies thereby affording further economy of manufacture.

Other objects and advantages of the present invention will appear in the following detailed description taken in connection with the accompanying drawing in which:

Fig. 1 is a view in side elevation of a valve body embodying the principles of my invention.

Fig. 2 is a top plan view illustrating a valve body exemplifying the principles of a modified form of my invention.

Figs. 3 and 4 are detailed views in side elevation illustrating certain advantageous features of my invention.

Referring to Fig. 1, the central portion of a valve body 1 of a conventional type is provided with a flange 2, or like conventional structure, to which a frame for supporting the valve parts may be attached. The central portion 1 of the valve body is provided with a recess or chamber 3 which may have the valve seat formed as a part thereof or which may receive an inserted valve seat. Lateral passages 4 are provided to conduct fluid into and out of the chamber 3 under the control of a valve operating therein. The central portion 1 of the valve body may be formed as a steel casting or alternatively and preferably the central portion 1 may be formed by forging. As will be observed in Fig. 1, the passages 4 extend through necks 5, laterally disposed on the central portion 1 which are cut short as compared to the conventional length of those parts. By forming the central portion 1 of the valve body independently of the ends which serve to connect the valve body to conduit or the like, the structural make up of the part 1 is simplified thereby simplifying the operations which are necessary to form such a central portion, especially when it is to be made by forging.

An alternative construction of the central portion of the valve body is illustrated in Fig. 2. As shown in that figure the central portion 11 having the flange 12, the valve recess 13, the lateral passages 14 in the necks 15 are like the corresponding parts of the central portion 1 of Fig. 1. The central portion 11 is made of two complementary sections which preferably although not necessarily are halves of the complete central portion. As illustrated in Fig. 2, the central portion 11 may be divided into sections along a plane which is symmetrical with respect to the chamber 13 and which extends through the axis of the lateral passages 14. By so dividing the central portion 11 into such sections which, in this particular instance, are halves, the several parts are of such a structural form that they are readily amenable to forging operations. As compared with forging the whole body as a unit or as compared with forging even the central portion 1 of the valve body as a unit, the construction of Fig. 2, providing complementary sections each of which may easily be forged, is a construction which is much cheaper to make. The particular line of division of the central portion 11 of the valve body into complementary sections may be varied if desired. For instance the central portion 11 may be divided along a plane which is symmetrical with respect to the central chamber 13 but which extends in a direction perpendicular to the axis of the central passage 14. Here again the individual parts would be much easier to forge than a central portion as a whole and, to an even greater degree, than to forge the valve body as a whole. Alternatively, the central portion 11 of the valve body may be divided into a plurality of complementary sections, not necessarily limited to two, along any dividing lines which afford such a form of construction in the complemental parts as is readily amenable to mass production methods, forging or otherwise.

The complemental parts or sections of the central portion 11 of the valve ordinarily may then be united to form the completed central portion 11 in any suitable manner as by welding those parts together as indicated at 16' in Fig. 2. The welding operation may be of the resistance or flash type.

Where the central portion of the valve body is of one piece, as illustrated in Fig. 1, the valve body may be divided along planes perpendicular to the axis of the lateral passages. Other planes of division of the valve body into complemental sections may be selected. It is found convenient to divide the valve body into sections as illustrated in Fig. 1 since the elimination of the flanged end members 6 simplifies the structural form of the central portion 1 to a great degree thereby simplifying the manufacturing operations upon that part. The flanged end members 6 are of a form that they may readily and inexpensively be made by a forging operation. Alternatively, the flanged end members 6 may be cast, machined or formed by upsetting blank stock or in any other suitable manner. Also, end members 6 may take any suitable conventional form, which may either be the flanged form illustrated or the tubular screw threaded form. The particular construction of end members 6 is determined by the type of connection between the valve body and the conduit associated therewith and does not constitute an essential part of this invention. By dividing the valve body into complementary sections along planes extending through the reduced neck portion 5 a small area of metal at the junction between the complemental sections is afforded. The complemental sections may be united by welding, which operation may be carried out by either the resistance or flash methods. The welded joint uniting a flanged end member 6 and a reduced neck portion 5, is illustrated at 7 in Fig. 1 in the drawing. A small area of contact between the end member 6 and the neck portion 5 reduces the cost and the difficulty of uniting the parts securely by a welded joint.

The various advantages which accrue from dividing the valve between those sections, as illustrated in Fig. 1, also attach to the form of the invention illustrated in Fig. 2 in which the end members 16 are formed as separate parts to be united with the central portion 11 at the neck portion 15 in a manner similar to that described in connection with Fig. 1. In my co-pending application Serial No. 586,747 filed January 15, 1932 a type of valve body construction is disclosed in which the entire body may be divided into complemental sections along a plane extending vertically through the axis of the lateral passages formed in the valve body. In such a construction, especially where the end members 16 are flanged, the surface area of contact between the divided end flanges is very large which adds greatly to the cost and to the difficulty of uniting those parts satisfactorily by welding the joint. According to the present invention, as illustrated by Fig. 2, the central portion 11 of the valve body is made in complemental sections thereby affording the advantages of greater facility in forging or other operations which may be formed on those sections in the manufacture of the central portion of the valve body. The constructiton illustrated by Fig. 2 avoids welding the flange members 16 from separate halves inasmuch as those parts, according to the present invention, preferably are made as a single piece by forging or any other suitable operation. The flanged end member 16 may be united with central portion 11 of the valve body along a welded joint 17 in a manner described in connection with Fig. 1.

The particular location selected for dividing the end or the conduit connecting members from the central portion of the valve body has still another advantage which is illustrated in Figs. 3 and 4. As shown in those figures, the fragmentary portion of the central portion 21 of the valve body is the same. It happens, for instance, in the specifications a valve designed to handle fluid pressures up to three hundred pounds per square inch that the minimum wall thickness of the valve body is one-half inch for a four inch valve. Also the minimum wall thickness for a four inch valve designed to handle fluid pressures up to four hundred pounds per square inch is one-half inch. Those valve bodies, according to standard specification, have only one essential difference, namely the length of the valve body from face to face of the flanges. The four inch valve for handling pressures up to three hundred pounds per square inch is 12 inches from face to face of the flange. The four inch valve of a size to handle pressures of four hundred pounds per square inch is sixteen inches from face to face of the flange. It is evident therefore that the central portion 21 of the valve body may be the same for four inch valves for both the three hundred pound pressure series and the four hundred pound pressure series. In order to make up a completed valve body for either one or the other of the two pressure series it is necessary only to provide flanged end members 26 and 36 having neck portions 27 or 37 of such a length that when united with the central portion 21 the proper length between the faces of the flanges will be provided according to the specifications for that size of valve. Thus it is seen, for those two sizes of valves, the central portion 21 may be standardized thus affording an economy of manufacture. The end members 26 and 36, which are relatively easy and inexpensive to manufacture, may be made in various sizes so that a completed valve body may be built up for either one of the two valve sizes. There are many other instances where the central portion of the valve body may be standardized for two or more sizes of valves which differ essentially only in the length between the flange faces. Thus the number of central portions 21 necessary in order to provide a complete line of valves of all sizes is greatly reduced with a corresponding reduction in the manufacturing equipment for making such parts.

Where this invention is used in the manufacture of valve bodies by forging the heat imparted to the forged parts may be utilized to assist in effecting the welding operation. To that end, the various complemental parts afforded have been forged and while still hot are welded together by suitable apparatus of the conventional type. By effecting the welding operation while the metal parts are still hot from the forging operation a saving in electrical current is afforded and a better weld is secured. Where cold articles are welded the parts are at a maximum temperature at the point of the weld which temperature falls very rapidly in the metal as the seat of the weld is departed from. Such a pronounced temperature gradient brings about a condition where at a certain point in the metal slightly removed from the weld, the metal is left in a brittle condition thus forming a weak section in the welded body. By welding the various parts of the metal while they are still hot from the forging operation the temperature gradient adjacent to the welded joint is not so pronounced and crystallization of the metal may be entirely avoided or at least alleviated to a pronounced degree thus affording a superior weld.

While the invention has been described especially in connection with the forging method of manufacture of the parts of the valve it obviously may be extended to valves made up by other manufacturing methods such as casting of the central portion of the valve body and such as casting, machining, stamping or pressing of the end or conduit connecting members of the valve. Also while the valve body, by implication has been indicated as being made of ferrous metal, the invention obviously may be extended to other materials adapted to manufacturing of valve bodies.

This application is a continuation, in part, of my co-pending application Serial No. 586,747, filed January 15, 1932.

While the invention has been described in detail by way of illustration it is not intended so to limit the invention inasmuch as modifications in the construction and arrangement of the parts thereof may be made without departing from the spirit and scope of the invention as defined in the following claims.

I claim:

1. A built up valve body consisting of two forged longitudinally parted, complemental sections electrically welded together to form a central portion, and forged conduit connecting members electrically welded to the central portion in planes extending transversely of the latter, each complemental section having parts of substantially the same dimensions as the part of the other section abutting thereagainst and welded thereto, the central portion having cylindrical, substantially equal thickness projections defining fluid passages, the conduit connecting members having cylindrical projecting walls substantially equal in thickness and diameter to the cylindrical projections of the central portion.

2. A built up valve body consisting of two forged longitudinally parted, complemental sections electrically welded together to form a central portion, and forged conduit connecting members electrically welded to the central portion in planes extending transversely of the latter, each complemental section having parts of substantially the same dimensions as the part of the other section abutting thereagainst and welded thereto, the central portion having cylindrical substantially equal thickness projections defining fluid passages, the conduit connecting members having cylindrical projecting walls substantially equal in thickness and diameter to the cylindrical projections of the central portion, the built up body having properties characteristic of a valve body formed from separate metal parts electrically welded together while hot as from a forging operation.

CHARLES H. SMITH.